US011715064B1

(12) United States Patent
Conrad et al.

(10) Patent No.: US 11,715,064 B1
(45) Date of Patent: Aug. 1, 2023

(54) INVENTORY SYSTEM AND METHODS OF USING THE SAME

(71) Applicant: BarTrac, Inc, Spring, TX (US)

(72) Inventors: Robert Alan Conrad, Spring, TX (US); Andrew Thomas Yee, Friendswood, TX (US)

(73) Assignee: BARTRAC, INC, Spring, TX (US)

( * ) Notice: Subject to any disclaimer, the term of this patent is extended or adjusted under 35 U.S.C. 154(b) by 0 days.

(21) Appl. No.: 17/853,603

(22) Filed: Jun. 29, 2022

Related U.S. Application Data

(60) Provisional application No. 63/352,549, filed on Jun. 15, 2022.

(51) Int. Cl.
*G06Q 10/00* (2023.01)
*G06Q 10/087* (2023.01)
*G06K 7/10* (2006.01)

(52) U.S. Cl.
CPC ....... *G06Q 10/087* (2013.01); *G06K 7/10366* (2013.01)

(58) Field of Classification Search
CPC .......... G06Q 10/087; G06K 7/10366
USPC .......................................................... 705/28
See application file for complete search history.

(56) References Cited

U.S. PATENT DOCUMENTS

| 11,170,409 B2* | 11/2021 | Walden | G06Q 10/0833 |
| 2008/0082360 A1* | 4/2008 | Bailey | G06Q 10/06 705/28 |
| 2018/0322449 A1* | 11/2018 | Schiller | G06Q 30/0633 |
| 2019/0295148 A1* | 9/2019 | Lefkow | G06Q 10/0833 |
| 2020/0306973 A1* | 10/2020 | Edwards | B65G 1/1373 |
| 2022/0268620 A1* | 8/2022 | Schiller | G06Q 10/087 |

FOREIGN PATENT DOCUMENTS

WO WO-2021148678 A1 * 7/2021 ......... G06K 7/10227

* cited by examiner

*Primary Examiner* — Russell S Glass
(74) *Attorney, Agent, or Firm* — William R. Childs; Childs Patent Law PLLC

(57) ABSTRACT

The present disclosure relates to an inventory system, wherein the inventory system includes at least one Internet of Things (IOT) inventory device having at least one pressure sensor and a radio field antenna, wherein a weighing surface is located on a top side of the at least (IOT) inventory device, and wherein the radio field antenna is positioned beneath the weighing surface.

11 Claims, 5 Drawing Sheets

100

INVENTORY SYSTEM AND METHODS OF USING THE SAME

CROSS REFERENCE TO RELATED APPLICATIONS

This U.S. Application is a Non-Provisional Application of U.S. Provisional Application No. 63/352,549, filed on Jun. 15, 2022, which is incorporated by reference in its entirety.

TECHNICAL FIELD

The present disclosure relates to inventory systems and methods for the use thereof, wherein the inventory system includes at least one Internet of Things (IOT) inventory device. A benefit of the inventory systems can be to allow for multiple inventory devices to be networked such that multiple devices can identify and weight inventory items and report data to a communications hub. Additional benefits can be reduced power consumption and reduction of weighing inaccuracies.

BACKGROUND

One of the biggest challenges in successfully managing any warehouse, stockroom, shipping area, supply depot, retail center, restaurant, bar, or any other item-based business is the need to control inventory. Inventory control requires constant and accurate monitoring of inventory condition, inventory location and inventory levels. Taking inventory is an activity required to monitor inventory. This activity is an incredibly time and labor-intensive task that costs millions of dollars per year. Yet inventory must be taken accurately and often. If too many items are kept in inventory, then capital is tied up in inventory and storage space becomes costly and problematic. If too few items are kept in inventory, then the business may run out of items to sell when a customer wants them, resulting in missed sales and lost customers. Also, businesses need to monitory inventory to detect breakage, theft, and other causes of lost inventory to address those inventory losses. Business success requires inventory control for financial management and for customer satisfaction.

There have been advances in technology for monitoring the inventory of large, whole items for storage, shipping, and retail businesses. Barcodes are often scanned to monitor inventory as it arrives and departs from the business. Retail businesses often use radio frequency identification (RFID) tags to monitor and/or prevent theft of items, especially garments and electronics.

However, despite all these advances, there remains a need for an inventory system that can track the inventory of items having an amount of content that varies over time. For example, consider the complex plight of the beverage and hospitality industry. Many bars have significant amounts of money invested in inventories of alcoholic beverages that are stored in many different bottles. In some jurisdictions, there are regulatory requirements to track the inventory for taxing purposes. The bottles may be opened or unopened; the contents may be sold by the bottle, by the glass, or by the portion for mixed drinks; and the contents may have vastly different prices per serving. Worse, during peak times, bartenders may not be able to place an opened bottle in the exact position where it was previously stored. Bartenders may not be able to find the opened bottle and may open another one. Also, consumers often buy different amounts of the contents of a bottle at different rates over different periods of time. Then there is the issue of content loss due to evaporation of alcohols that sit for months after being opened. Manual methods to control this complex process are prone to inaccuracy and is time consuming.

This inventory dilemma has created a huge, costly headache for the beverage and hospitality industry. Many bars and hotels are forced to spend hours per day taking inventory of every bottle of alcoholic beverage, often multiple times per day. This task can cost a business tens of thousands of dollars in wages and be the most unpleasant part of any bartender's job.

This example is hardly isolated. The inventory of containers often depends on taking an inventory of the contents of opened containers containing high value or regulatory controlled items. For example, many hospitals need to track how many pills remain in an opened bottle and where the bottle is located. Many sellers of small amounts of solids or liquids need to track inventory of chemicals, such as a solid, a liquid, or a slurry; small parts, such as nuts, bolts, and screws; small high value items such as gem stones and jewelry; and consumables, such as coffee, tea, sugar, and nuts; or any other item where it is inconvenient or impossible to attach an inventory label to the product itself due to size, method of storage, or other product attribute.

For e-commerce to be efficient, requires warehouses and shipping centers filled with items in boxes and shipping containers, and the precise number and locations of those items must be accounted for at all times despite quick turnover rates, multiple operators, and varying levels of operator skill. This requires inventory systems with sensors and detectors that are capable of being networked with a communication hub and allow for the accurate and efficient passing of data from the sensors to a database in real time.

There remains a need for an inventory system that provides solutions to at least the above-mentioned challenges. There remains a need to cost effectively maintain real-time records of the number, location, and content of containers and opened containers on a massive parallel basis. This complex and important business function can benefit from the accuracy, speed and efficiency of automation.

SUMMARY

The present disclosure relates to an inventory system. In an embodiment, the inventory system includes a plurality of tagged inventory items, wherein the plurality tagged inventory items includes a radio field tag attached to an inventory item; and a plurality of Internet of Things (IOT) inventory devices, wherein the plurality of Internet of Things (IOT) inventory devices includes a weighing surface and contains at least one pressure sensor, a pressure sensor processor, a radio field antenna, a radio field antenna processor, and an Internet of Things (IOT) processor, wherein the weighing surface is located on a top side of the plurality of IOT inventory devices, and the radio field antenna is positioned beneath the weighing surface, and wherein the IOT processor is connected to the at least one pressure sensor through the pressure sensor processor and the IOT processor is connected to the radio field antenna through the radio field antenna processor; and wherein at least one member of the plurality of IOT inventory devices is connected to a communications node.

In some embodiments of the inventory system, the radio field tag includes an item adhesive layer, a polymer foam layer, and an integrated circuit layer, and wherein the polymer foam layer is in contact with and located between the item adhesive layer and the integrated circuit layer. In some embodiments, the radio field tag is a passive radio frequency identification tag, a battery assisted radio frequency identification tag, an active radio frequency identification tag, or a passive nearfield tag. In some embodiments, the at least one radio field antenna includes an active radio field antenna or a passive radio field antenna. In some embodiments, the plurality of inventory devices includes a top and a bottom, wherein the at least one pressure sensor includes an array of force sensing resistors located between the weighing surface and the at least one radio field antenna. In some embodiments, the at least one pressures sensor is connected to supports that extend from the bottom of the inventory device.

In some embodiments, the IOT processor includes a memory storage, a wireless processor, and a transmitter, wherein the wireless processor includes a receive packet input and a transmit packet output, and the wireless processor is capable of or configured to transmit wireless packets and receive wireless packets.

In some embodiments, the communications node is a wireless communications node. In an embodiment, the communications node is an internet router, a wireless internet router, a cellular tower, a communications satellite, or a combination thereof.

In some embodiments, the inventory system further comprises a server connected to the communications node through an internet. In some embodiments, the inventory system further comprises a plurality of the IOT inventory devices networked through a plurality of communications nodes.

Embodiments of a method of detecting and reporting a plurality of tagged inventory items are disclosed. In an embodiment, the method includes: providing a plurality of tagged inventory items, wherein the plurality tagged inventory items include a radio field tag attached to an inventory item; and providing a plurality of Internet of Things (IOT) inventory devices, wherein the plurality of IOT inventory devices include a weighing surface and contains at least one pressure sensor, a pressure sensor processor, a radio field antenna, a radio field antenna processor, and an IOT processor, wherein the weighing surface is located on a top side of the plurality of IOT inventory devices, and the radio field antenna is positioned beneath the weighing surface, and wherein the IOT processor is connected to at least one pressure sensor through the pressure sensor processor and the IOT processor is connected to the radio field antenna through the radio field antenna processor; and wherein at least one member of the plurality of IOT inventory devices is connected to a communications node. The method further includes detecting a weight change of from about 25.0 g to about 45.0 kg when a member of the plurality of tagged inventory items is placed into contact with the weighing surface of a member of the plurality of IOT inventory devices, determining that a difference between a load pressure of the member of the plurality of tagged inventory items and the last measured load pressure for the member of the plurality of IOT inventory devices exceeds a threshold value, and identifying the member of the plurality of tagged inventory items by scanning the radio field tag with the radio field antenna.

In some embodiments, determining that the difference between the load pressure of the member of the plurality of tagged inventory items and the last measured load pressure for the member of the plurality of IOT inventory devices exceeds the threshold value includes, measuring the load pressure of the member of the plurality of tagged inventory items; and retrieving the last measured load pressure from the pressure sensor processor of the member of the plurality of IOT inventory devices, and subtracting the measured load pressure from the last measured load pressure.

In some embodiments, identifying the member of the plurality of tagged inventory items by scanning the radio field tag with the radio field antenna includes, generating a scanned radio field identification from the member of the plurality of tagged inventory items by turning on or activating the radio field antenna of the member of the plurality of IOT inventory devices and scanning the radio field tag, retrieving local radio field identification data from the IOT processor of the member of the plurality of IOT inventory devices, and determining that a new radio field tag is present by comparing the scanned radio field identification to the local radio field identification data.

In some embodiments, the method further includes, after identifying the member of the plurality of tagged inventory items by scanning the radio field tag with the radio field antenna, building a data frame in the IOT processor of the member of the plurality of IOT inventory devices, and transmitting the data frame from the IOT processor of the member of the plurality of IOT inventory devices to the communications node.

In some embodiments, building the data frame in the IOT processor of the member of the plurality of IOT inventory devices includes, retrieving two or more of: the load pressure of the member of the plurality of tagged inventory items, the scanned radio field identification of the member of the plurality of tagged inventory items, a load transaction date, a load transaction time, and identification data from the member of the plurality of IOT inventory devices, or a combination thereof.

In some embodiments, transmitting the data frame from the IOT processor of the member of the plurality of IOT inventory devices to the communications node includes, sending the data frame to a first in, first out (FIFO) buffer of the IOT processor of the member of the plurality of IOT inventory devices, transmitting the data frame from the IOT processor to the least one communication node, and reducing power usage by the member of the plurality of IOT inventory devices by deactivating or turning off the radio field antenna of the member of the plurality of IOT inventory devices.

Embodiments of a computer program product for detecting and reporting a plurality of tagged inventory items are disclosed. In an embodiment, the computer program product includes one or more computer readable storage media collectively having program instructions embodied therewith, the program instructions executable by an Internet of Things (IOT) processor to: cause the IOT processor to detect a weight change of from about 25.0 g to about 45.0 kg when a member of a plurality of tagged inventory items is placed into contact with a weighing surface of a member of a plurality of Internet of Things (IOT) inventory devices, wherein the plurality of IOT inventory devices includes the weighing surface and contains at least one pressure sensor, a pressure sensor processor, a radio field antenna, a radio field antenna processor, and the Internet of Things (IOT) processor, wherein member of the plurality of IOT inventory devices is connected to a database through a communications node; determine that a difference between a load pressure of the member of the plurality of tagged inventory items and a last measured load pressure for the member of the plurality of IOT inventory devices exceeds a threshold value; and identify the member of the plurality of tagged inventory items by scanning the radio field tag with the radio field antenna. In an embodiment of the computer program product, the program instructions further cause the IOT processor to: measure the load pressure of the member of the plurality of tagged inventory items, and retrieve the last measured load pressure from the pressure sensor processor of the member of the plurality of IOT inventory devices, and subtract the measured load pressure from the last measured load pressure.

In some embodiments of the computer program product, the program instructions further cause the IOT processor to: generate a scanned radio field identification from the member of the plurality of tagged inventory items by turning on or activating the radio field antenna of the member of the plurality of IOT inventory devices and scanning the radio field tag, retrieve local radio field identification data from the IOT processor of the member of the plurality of IOT inventory devices, and determine that a new radio field tag is present by comparing the scanned radio field identification to the local radio field identification data. In some embodiments of the computer program product, the program instructions further cause the IOT processor to: build a data frame in the IOT processor of the member of the plurality of IOT inventory devices, and transmit the data frame from the IOT processor of the member of the plurality of IOT inventory devices to the communications node. In some embodiments of the computer program product, the program instructions further cause the IOT processor to: send the data frame to a first in, first out (FIFO) buffer of the IOT processor of the member of the plurality of IOT inventory devices, transmit the data frame from the IOT processor to the communications node, and then reduce power usage by the member of the plurality of IOT inventory devices by deactivating or turning off the radio field antenna of the member of the plurality of IOT inventory devices. In some embodiments of the computer program product, the program instructions further cause the IOT processor to: command the pressure sensor processor to send a data stream of pressure sensor values from the pressure sensor processor to the IOT processor; determine that no difference between load pressures of the data stream and a last measured load pressure for the member of the plurality of IOT inventory devices has exceeded the threshold value for a threshold duration; and perform a periodic scan when the threshold duration is met by sending a command to the radio field antenna to scan for tagged inventory items; build a periodic data frame in the IOT processor of the member of the plurality of IOT inventory devices; and transmit the periodic data frame to the database through the communications hub.

BRIEF DESCRIPTION OF THE DRAWINGS

The foregoing summary, as well as the following detailed description of the embodiments, will be better understood when read in conjunction with the attached drawings. For the purpose of illustration, there are shown in the drawings some embodiments, which may be preferable. It should be understood that the embodiments depicted are not limited to the precise details shown and are not drawn to scale.

DETAILED DESCRIPTION

Figure 1:
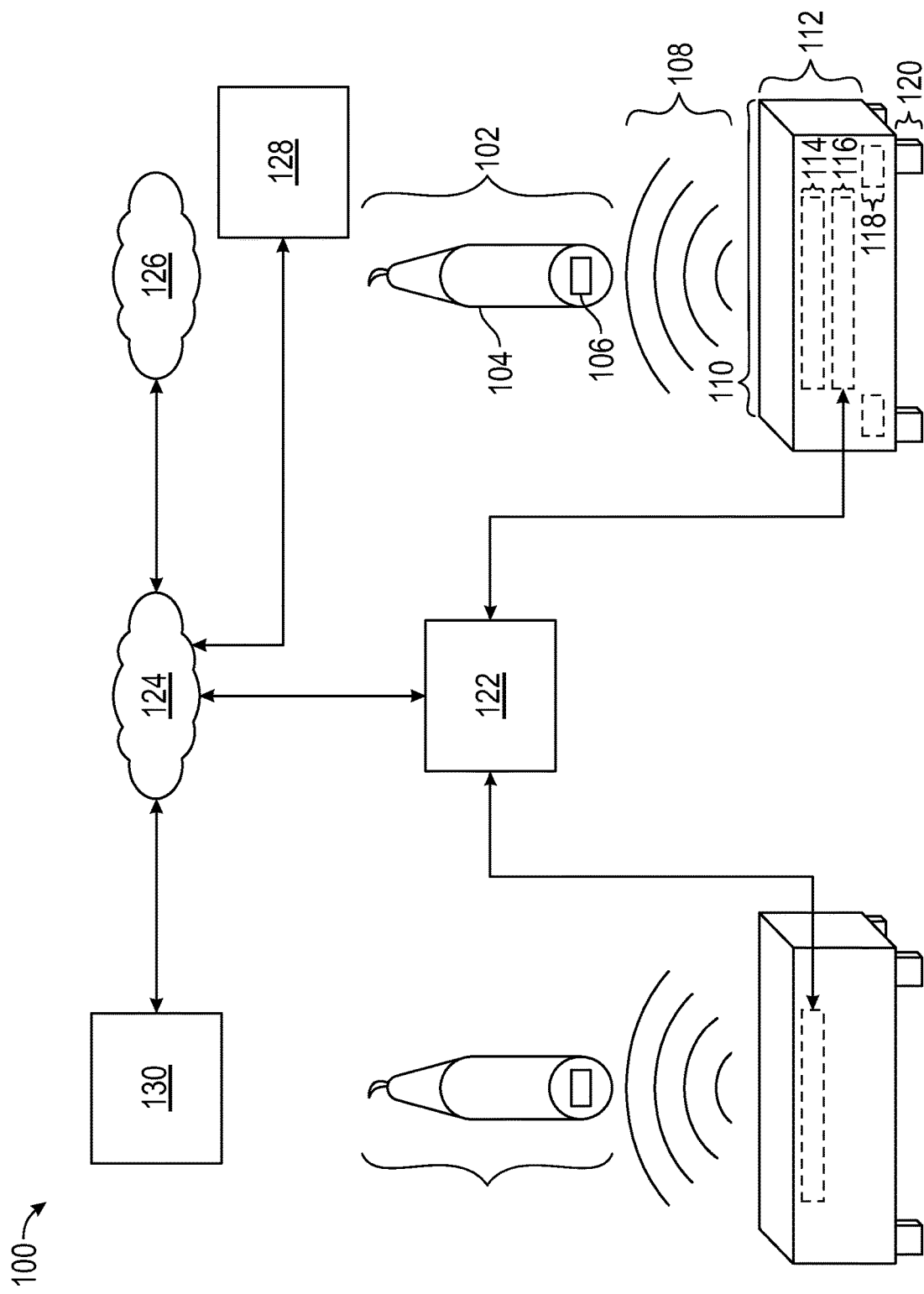
FIG. 1 is a schematic depiction of an embodiment of a system.

Conventional inventory systems can take, monitor, and record the inventory of large, whole items based on the assumption that the contents of the item being inventoried will not change over time. Conventional inventory systems can take the inventory of items only as they move into and out of a controlled area, such as a retail store or warehouse. These conventional inventory systems may be adequate when selling whole items, such as garments, or packaged items, such as electronics. However, many industries, such as the entertainment industry and the hospitality industry do not just sell whole items. Instead, they sell portions of inventory items, such as liquor by the glass or by the portion. These industries spend millions of dollars on labor taking frequent inventory of bottles of their alcoholic beverages to determine their current inventory and to plan for maintaining that inventory.

These labor costs have been necessary because there does not appear to be any inventory system that is capable of maintaining a real time inventory of items, tracking varying amounts of content in the inventory items, or tracking the current location of multiple inventory items within a retail or storage space an inventory device until an inventory device was disclosed that was capable of identifying and weighing tagged inventory items in real-time. See, U.S. Pat. No. 10,769,589, which is incorporated by reference in its entirety.

However, as revolutionary as this inventory device was and continues to be, there is a need for a system that is capable of networking such inventory devices, or embodiments thereof, into a system that is capable of tracking hundreds of inventory devices in hundreds of different locations and transmitting that data to remotely connected databases for processing. There are also design improvements to consider. For example, the legacy systems used an array of thin-film weight sensors that were located on the top of the inventory device between the RFID antenna and the weighing surface located on the top of the inventory device. There is room for improvement because such a design may be undesirable and impractical because of increasing cost and technical difficulty in manufacturing and employing thin film weight sensors.

Another challenge relates to using the inventory devices to identify, weigh, and store the inventory item on the inventory device for short or long durations. Some of the existing inventory systems can use RFID technology to identify items that are placed on the weighing scale or surface of the inventory device. One of the challenges with such systems is that the RFID antennas use a lot of power if they are kept on constantly and hence may not be power efficient. Additionally, constantly transmitting RFID systems may increase the likelihood for undesirable levels of local electromagnetic interference. Yet another challenge is that the system tends to drift, recording the weight of the item as heavier and heavier overtime due to various factors. Still a further challenge is that the inventory device of the system or one or more components therein, may be damaged, tampered with, lose power, or otherwise be disabled during operation. Discovery and rectification of such malfunctioning may not be easy or efficient and often leads to additional overhead in terms of effort, time, and cost.

An inventory system is disclosed herein that is capable of networking a plurality of inventory devices that are capable of tracking many items, reducing power usage during operation, and avoiding weight drift during usage when items are stored on top of the inventory devices. In some embodiments, the disclosed systems propose a design in which the inventory device includes at least one radio field antenna underneath a weighing surface, wherein the weighing surface is located on top of the inventory device. In some embodiments, the inventory device further includes a plurality of pressure sensors that are attached to a plurality of supports underneath or on the bottom of the inventory device. In this way, the system implements one or pressure sensors, beneath the at least one radio field antenna, that are configured to weigh the pressure or weight of an item that is placed on top of the device on the weighing surface as it exerts pressure downwards against the plurality of supports. In some embodiments, the inventory device includes at least one radio field antenna and a radio field antenna processor to drive the antenna. The radio field antenna processor is connected to a processor which may be an Internet of Things ((IOT) processor. The plurality of pressure sensors is attached to the plurality of supports and communicate with the IOT processor through a pressure sensor processor. Further, the IOT processor is connected to a transceiver for communication with other devices.

Unless otherwise noted, all measurements are in standard metric units. Unless otherwise noted, all instances of the words "a," "an," or "the" can refer to one or more than one of the word that they modify.

Unless otherwise noted, the phrase "at least one" means one or more than one of an object. Unless otherwise noted, the phrase "at least one of" means one or more than one of the listed objects or any combination thereof. For example, the phrase "at least one of the database, the network, and the display" would mean the database, multiple data bases, the network, multiple networks, the display, multiple displays, or any combination thereof.

Unless otherwise noted, the term "about" refers to ±5% of the non-percentage number that is described. For example, about 100 g, can include from to 95 to 115 g. Unless otherwise noted, the term "about" refers to ±5% of a percentage number. For example, about 20% can include from 15 to 25%. When the term "about" is discussed in terms of a range, then the term refers to the appropriate amount less than the lower limit and more than the upper limit. For example, from about 100 g to about 200 g can include from 95 to 210 g.

Unless otherwise noted, a range of numbers includes all numbers in that range. For example, the range of 1-5 g includes 1 g, 2 g, 3 g, 4 g, 5 g, and any sub range therein.

Unless otherwise noted, the term "providing" refers to any method of manufacturing, purchasing, or any method of obtaining the object being referred to.

Unless otherwise noted, the term "real time" means from instantly to 72 hours.

Unless otherwise noted, the term "radio field tag" can be used interchangeably with "radio frequency tag."

It is understood that, depending on the context, the term "radio field tag" can include an adhesive backing when not attached to an inventory item. Conversely, it is understood that, depending on the context, the term "radio field tag" can exclude an adhesive backing when attached to an inventory item. Further, it is understood that the radio field tag can include an item adhesive layer, a polymer foam layer, and an integrated circuit layer, and wherein the polymer foam layer is in contact with and located between the item adhesive layer and the integrated circuit layer. In addition, it is understood that the radio field tag can include a passive radio frequency identification tag, a battery assisted radio frequency identification tag, an active radio frequency identification tag, or a passive nearfield tag.

Embodiments of an inventory system are disclosed herein. In some embodiments, the inventory system includes a plurality of tagged inventory items, wherein the plurality tagged inventory items includes a radio field tag attached to an inventory item; and a plurality of Internet of Things (JOT) inventory devices. In some embodiments, the plurality of Internet of Things (JOT) inventory devices includes a weighing surface and contains at least one pressure sensor, a pressure sensor processor, a radio field antenna, a radio field antenna processor, and an Internet of Things (JOT) processor, wherein the weighing surface is located on a top side of the plurality of IOT inventory devices, and the radio field antenna is positioned beneath the weighing surface. The IOT processor is connected to the at least one pressure sensor through the pressure sensor processor and the IOT processor is connected to the radio field antenna through the radio field antenna processor; and wherein at least one member of the plurality of IOT inventory devices is connected to a communications node.

System

In an embodiment, an inventory system is disclosed. Referring to FIG. 1, in an embodiment, the inventory system 100 includes a tagged inventory item 102, wherein the tagged inventory item 102 includes a radio field tag 106 attached to the inventory item 104. In an embodiment, the inventory system 100 further includes IOT inventory device 112 (herein after also referred to as "inventory device"). In an embodiment, the IOT inventory device includes an IOT processor 116. In an embodiment, the inventory device 112 includes at least one radio field antenna 114 inside the IOT inventory device beneath a weighing surface 110 on the top of the inventory device 112. In an embodiment, the IOT inventory device 112 includes at least one pressure sensor 118 attached to a plurality of supports 120 at the bottom of the inventory device 112. The at least one radio field antenna 114 and the at least one pressure sensor 118 are configured to, capable of, or positioned to weigh and identify the tagged inventory item through the weighing surface on top of the inventory device. In an embodiment, when the tagged inventory item 102 is placed into contact with or onto the weighing surface 110, then the weight of the tagged inventory item 102 can press down through the material of the weighing surface onto the at least one pressure sensor 118 attached to the plurality of supports 120 underneath. In an embodiment, in response to detecting a weight change, the at least one radio field antenna 114 is turned on, sending out a radio field signal 108. In an embodiment, the radio field signal 108 interacts with the radio field tag 106 to pass an identification code from the radio field tag 106 through the weighing surface to the at least one radio field antenna 114. In an embodiment, the at least one pressure sensors 118 weighs the tagged inventory item 102. In an embodiment, the at least one pressure sensor 118 and at least one radio field antenna 114 are configured to, connected to, or capable of communicating with the IOT processor 116. In an embodiment, the IOT processor 116 of one or more IOT inventory devices 112 is configured to, connected to, or capable of communicating with a communications hub 122, such as a wireless router. In an embodiment, the communications hub 122 is connected by the internet to a remote server 124. In an embodiment, the remote server 124 is connected by the internet or other electronic communications to a customer cloud server 126, a web portal 128, and operating software 130 for customer devices, such as computers, cellphones, and tablets.

In some embodiments, the inventory system 100 further comprises a plurality of the IOT inventory devices networked through a plurality of communications nodes. In some embodiments, the inventory system 100 further comprises one or more IOT devices 112 configured to manage the sensor systems in a plurality of IOT inventory devices.

In some embodiments, the components of the inventory system 100 communicate with each other using known communication technologies and networks including but not limited to a Wi-Fi network and a Bluetooth® network. In some embodiments, the components of the inventory system 100 can be connected to a cloud computing network to make use of numerous advantages provided by cloud computing and distributed computing networks.

An IOT inventory device is disclosed herein. In an embodiment, the IOT inventory device includes a weighing surface and contains at least one pressure sensor, a pressure sensor processor, a radio field antenna, a radio field antenna processor, and an Internet of Things ((IOT) processor, wherein the weighing surface is located on a top side of the plurality of IOT inventory devices, and the radio field antenna is positioned beneath the weighing surface, and wherein the IOT processor is connected to the at least one pressure sensor through the pressure sensor processor and the IOT processor is connected to the radio field antenna through the radio field antenna processor; and wherein at least one member of the plurality of IOT inventory devices is connected to a communications node.

Figure 2:
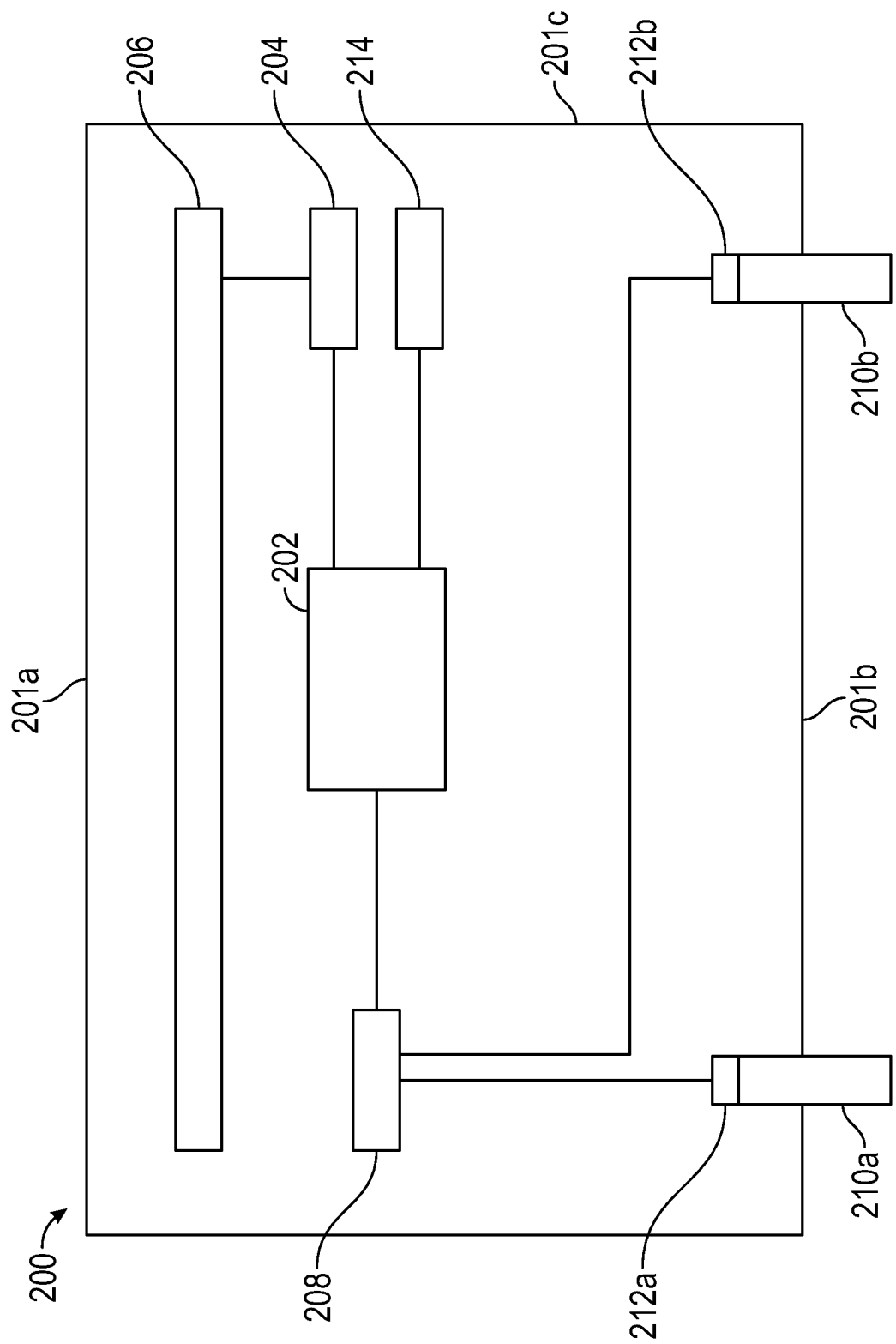
FIG. 2 is a schematic depiction of an embodiment of an Internet of Things (IOT) inventory device of the system.

Referring to FIG. 2, in an embodiment, the IOT inventory device 200 (also referred to hereinafter as "inventory device 200") has a top of the inventory device (201a), a bottom of the inventory device (201b), and at least one side of the inventory device (201c). In an embodiment, the inventory device 200 includes the top of the inventory device, which includes a weighing surface and a radio field antenna 206 underneath the weighing surface. The inventory device 200 further includes an IOT processor 202 communicatively coupled to a radio field antenna processor 204 that is configured to drive the radio field antenna 206. The IOT processor 202 is communicatively coupled to pressure sensors 212a and 212b through a pressure sensor processor 208. In an embodiment, the pressure sensors 212a and 212b are attached to the supports 210a and 210b, respectively. In the embodiment shown, the pressure sensors 212a and 212b are attached on top of the supports 210a and 210b. In an embodiment, the pressure sensors 212a and 212b are attached on a side surface of the supports 210a and 210b. In an embodiment, the IOT processor 202 is communicatively coupled to a transceiver (transmitter-receiver) 214 configured to communicate with other devices or nodes such as a communications node in a communication network.

In some embodiments, a plurality of pressure sensors can be positioned and attached to a single support. In some embodiments, the inventory device 200 includes a plurality of supports and each support can have one or more pressure sensors attached to it. In some embodiments, the plurality of pressure sensors can be located or housed inside the plurality of supports, such that the plurality of pressure sensors are surrounded or encased by the inner walls of the plurality of supports. In some embodiments, the plurality of pressure sensors can be in direct or indirect contact with the weighing surface. In some embodiments, the inventory device 200 includes a plurality of radio field antennas 206 positioned between the weighing surface and the at least one pressure sensor. In some embodiment, the at least one radio field antenna 206 is located between the plurality of supports and the weighing surface of the inventory device 210 when the plurality of pressure sensors are housed or encased within the plurality of sensors. In some embodiments, the pressure sensors 212a and 212b are closer to the bottom of the inventory device 200 than the at least one radio field antenna 206. In some embodiments, the pressure sensors 212a and 212b are communicatively coupled to the pressure sensor processor 208 that is configured to receive signals from the pressure sensors 212a and 212b and record the sensed pressure to measure weight of an inventory item.

In some embodiments, the pressure sensors 212a and 212b are connected to an array data wire, and the array data wire is connected to an array port. In an embodiment, the array port can be located in a side of the inventory device 200. In some embodiments, the pressure sensors 212a and 212b are connected to a power wire, and the power wire is connected to a power port. In some embodiments, the power port can be located in a side of the inventory device 200. In some embodiments, the at least one radio field antenna 206 is connected to an antenna data wire, and the antenna data wire is connected to an antenna port. In some embodiments, the antenna port can be located in a side of the inventory device 200. In some embodiments, the at least one radio field antenna 206 is connected to a power wire, and the power wire is connected to a power port. In some embodiments, the power port can be located in a side of the inventory device 200.

In some embodiments, the inventory device 200 includes a top and a bottom, wherein the at least one pressure sensor includes an array of force sensing resistors (FSRs) located between the at least one radio field antenna 206 and the supports 210a and 210b. In some embodiments, the at least one pressures sensor is connected to the supports 210a and 210b that extend from the bottom of the inventory device 200.

In some embodiments, the IOT processor 202 includes a memory storage, a wireless processor, and a transmitter, wherein the wireless processor includes a receive packet input and a transmit packet output, and the wireless processor is capable of, or configured to, transmit wireless packets and receive wireless packets.

In some embodiments, the communications node is a wireless communications node. In an embodiment, the communications node is an internet router, a wireless internet router, a cellular tower, a communications satellite, or a combination thereof.

Method

Figure 3:
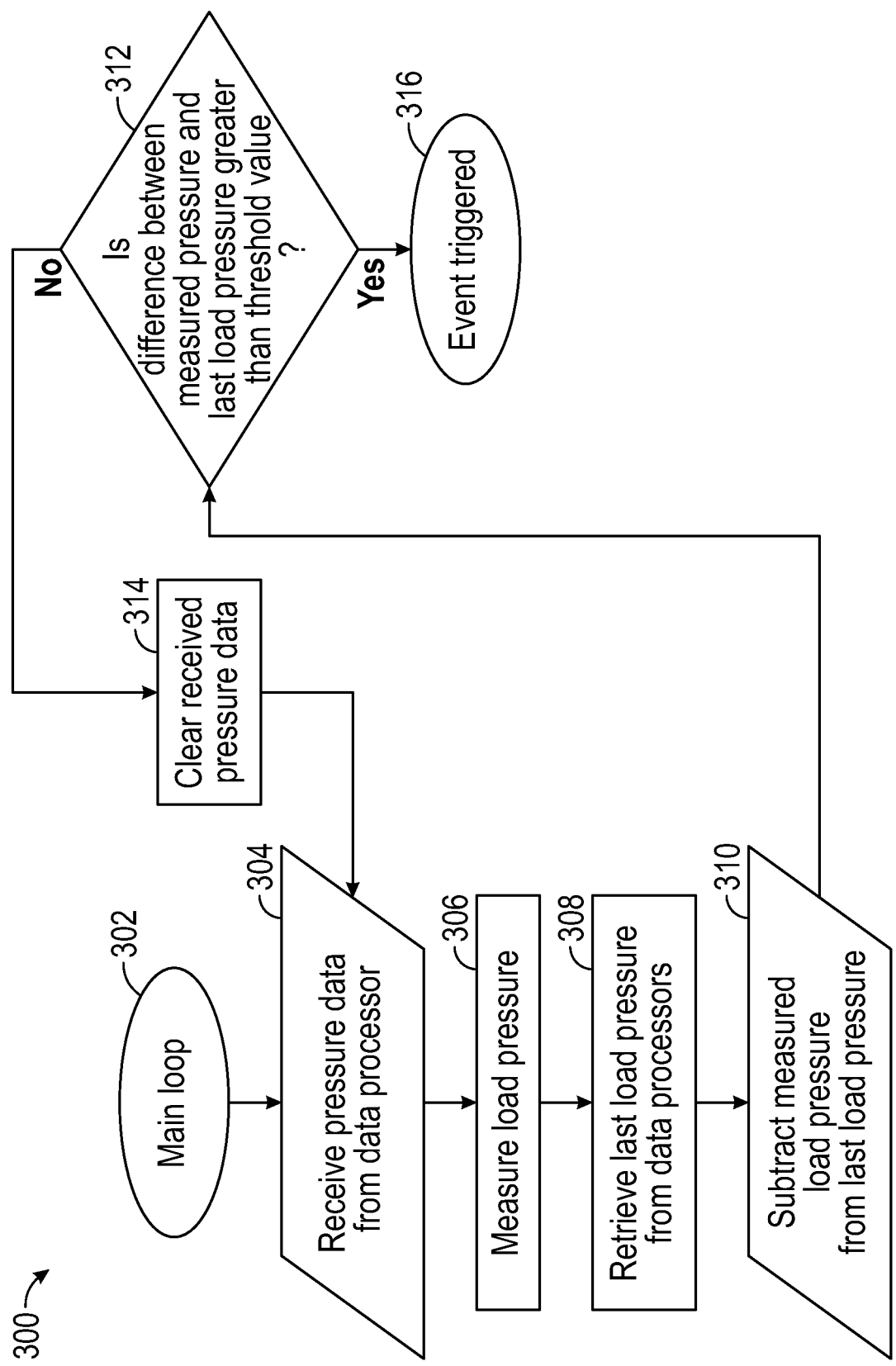
FIGS. 3, 4, and 5 illustrate a flow diagram of an embodiment of a method for operations within an embodiment of the system.
Figure 4:
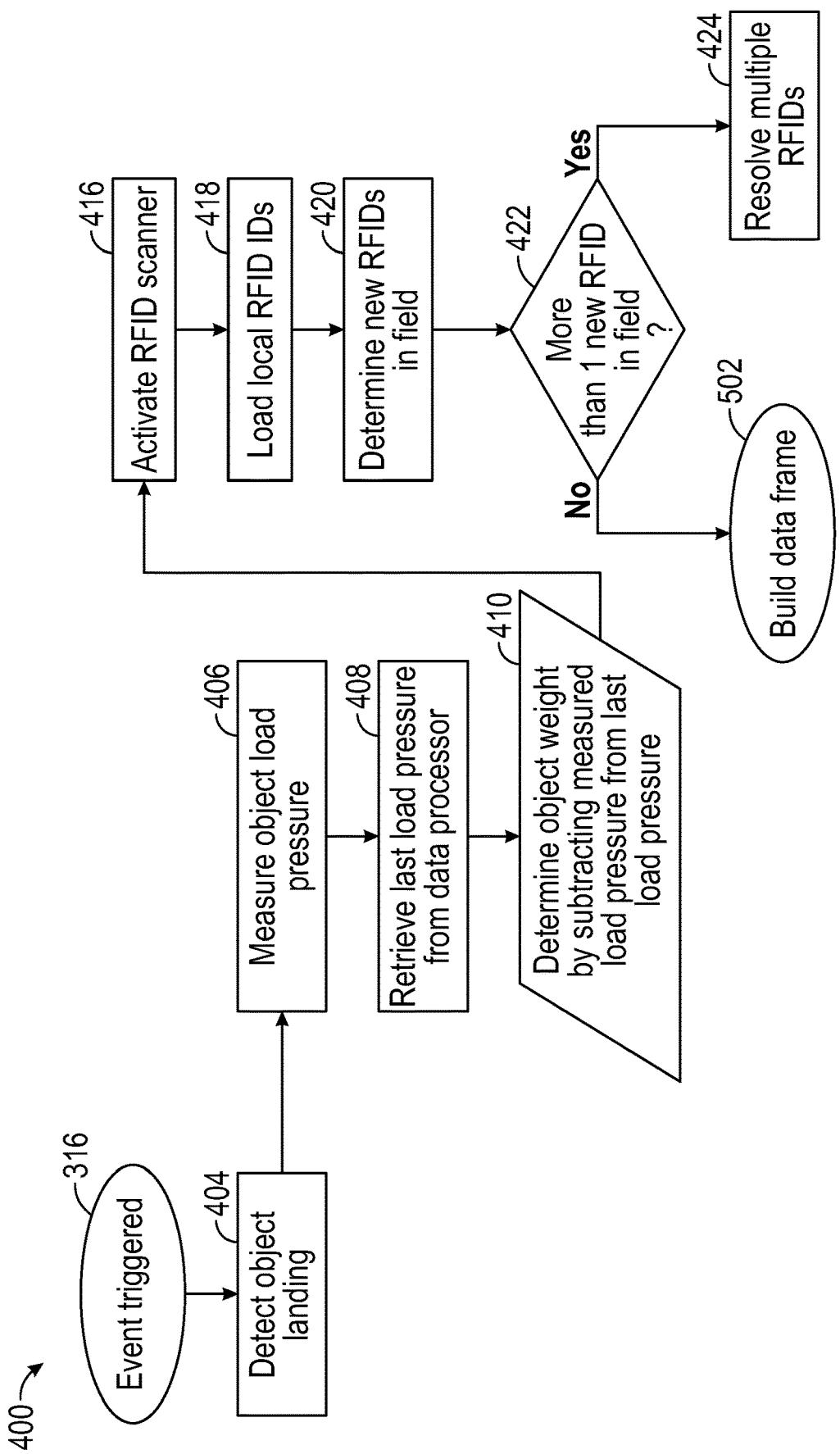
Figure 5:
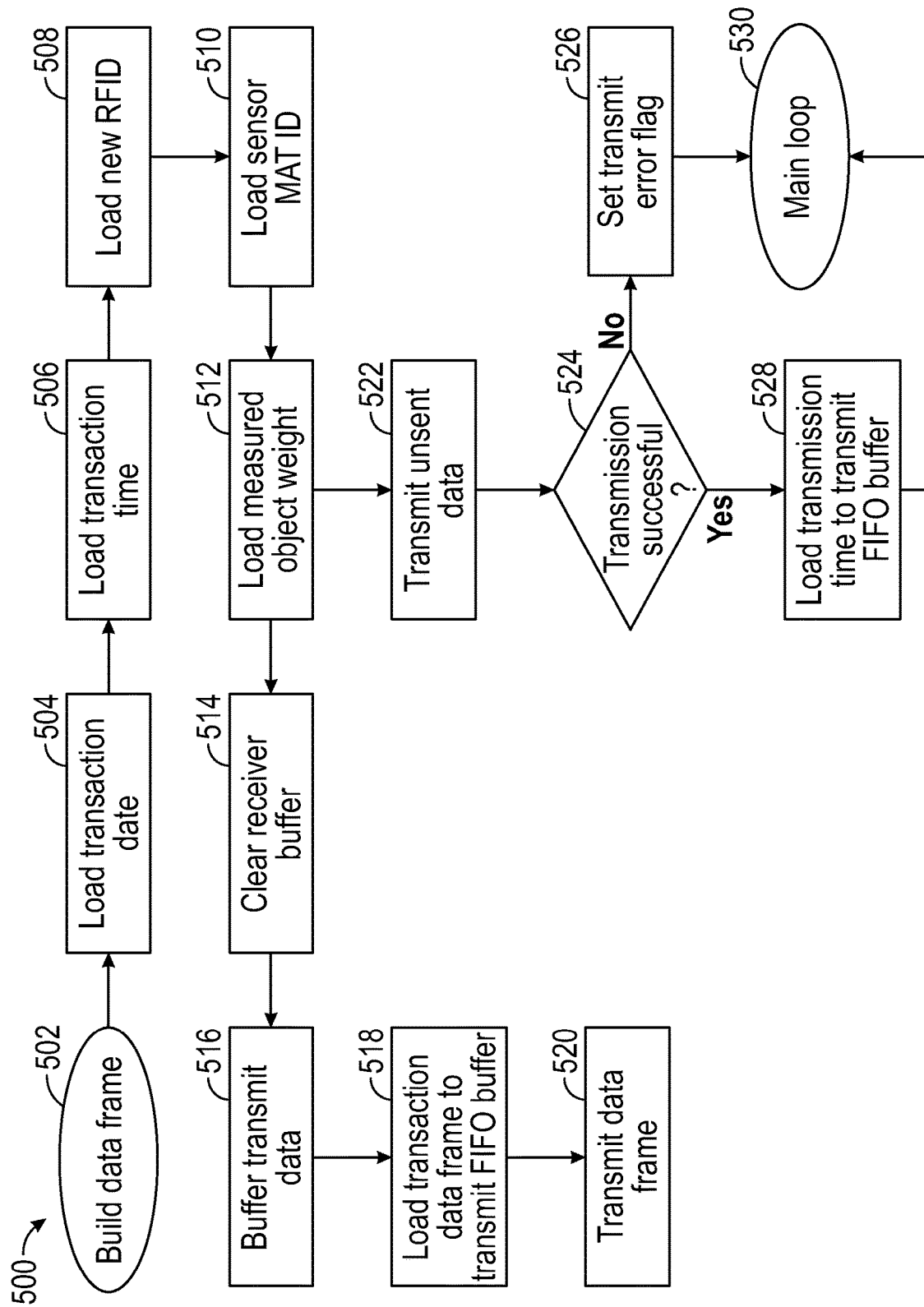

FIGS. 3, 4, and 5 illustrate a flow diagram of an embodiment of a method as disclosed herein. In some embodiments, the method is performed by the IOT processor 202 either alone or in conjunction with the radio field antenna processor 204 and the pressure sensor processor 208. For sake of clarity, the method is explained with reference to FIGS. 3, 4, and 5 that show methods 300, 400, and 500, respectively.

One of the challenges faced in existing systems that use RFIDs to identify items is that RFID antennas use a lot of power when kept in an "on" state constantly. The disclosed embodiments of the inventory system provide for a solution that includes, in an embodiment, constantly sending signals from the plurality of pressure sensors 212a and 212b and pressure sensor processor 208 to the IOT processor 202. In this embodiment, the IOT processor 202 is configured to decide whether or not a weight change has been detected. If the weight change exceeds a threshold weight change as per the method 300 shown in FIG. 3, then the IOT processor 202 is configured to trigger the radio field antenna processor 204 to turn the radio field antenna 206 to an "on" state and to identify one or more tagged inventory items according to the method 400 shown in FIG. 4.

Referring to FIG. 3, in an embodiment, the method 300 begins with the main loop 302 and proceeds to 304 receiving pressure data from data processor (e.g., pressure sensor processor 208). Next, the method proceeds to 306 measuring the load pressure and then to 308 retrieving the last load pressure from the data processor. Subsequently, the method proceeds to 310 subtracting measured load pressure from the retrieved last load pressure. At 312, method proceeds to determining if the difference between measured pressure and last load pressure is greater than a threshold value. In some embodiments, the threshold value may be a predetermined value set either manually by a user or automatically by the IOT processor 202 based on a set of factors. In some embodiments, the set of factors include a type of tagged inventory items, a type of content of the inventory items (e.g., liquid, solid), acceptable limits or ranges of error based on historical performance of the inventory device, the least count of the pressure sensors, and count of pressure sensors deployed in the inventory device.

If at 312, it is determined that the difference between measured pressure and last load pressure is not greater than the threshold value, the method proceeds to 314 clearing received pressure data and then proceeds or returns back to 304. If at 312, it is determined that the difference between measured pressure and last load pressure is greater than the threshold value, the method proceeds to 316 triggering an event. In an embodiment, the event corresponds to switching the radio field antenna 206 to an "on" state by the radio field processor 204 based on a trigger signal generated by the IOT processor 202 and consequently, the method 400 shown in FIG. 4 is executed.

Referring to FIG. 4, the method 400 is triggered at 316. Next, the method proceeds to 404 detection of object landing on the weighing surface by the radio field antenna 206. In an embodiment, the object corresponds to a tagged inventory item. Next, the method proceeds to 406 measuring of object load pressure and then to 408 retrieving of last load pressure from data processor (e.g., pressure sensor processor 208). Next, the method proceeds to 410 determining object weight by subtracting measured load pressure from the retrieved last load pressure. Next, the method proceeds to 416 activating the RFID scanner to determine object identity. The method proceeds further to 416 activating the RFID scanner and to 418 loading local RFID IDs. Next, the method proceeds to 420 determining new RFIDs in field or proximity. The method then proceeds to 422 determination of whether there are more than one new RFIDs in the field. If it is determined at 422 that there are no more than one new RFIDs in the field, the method proceeds to 502 building data frame. If is determined at 422 that there are more than one new RFIDs in the field, the method proceeds to 424 resolving multiple RFIDs.

Therefore, the radio field antenna 206 is turned on for just long enough to identify the one or more tagged inventory items and then turned back off. In some embodiments, the disclosed solution provides significant savings in power consumption of the inventory device 200 and the radio field antenna 206 can be reduced by as much as 50%, even during periods of high activity. Further, in periods of low or no activity, the radio field antenna 206 uses no power or very little power. An advantage of this solution is that the inventory device 200 reduces wastage of bandwidth and processing power by intermittently sending all of the collected weight measurements. For instance, referring to method 400 shown in FIG. 4, the inventory device 200 is configured to turn on the radio field antenna 206 and generate identification data only if a sufficient weight change (e.g., exceeding a weight change threshold) has been detected.

In some embodiments, the inventory device 200 can be configured to transmit data once it has collected all of the necessary information according to method 500 shown in FIG. 5. In some embodiments, the inventory device 200 is configured to send out the information as a single signal once all of the data necessary for the signal has been collected and loaded onto a transmit FIFO buffer. The inventory device 200 is further configured to determine if the transmission was successful and is configured to send an error flag if the transmission was not successful and log a transmission time if the transmission was successful.

Referring to FIG. 5, method 500 is shown that follows from the step 502 of building data frame. Next, the method proceeds to 504 loading of transaction date and then to 506 loading of transaction time. Next, the method proceeds to 508 loading of new RFID (determined at 420 for instance) and then to 510 loading of sensor mat ID (to determine the arriving inventory item location). In an embodiment, the sensor mat ID corresponds to ID of the weighing surface corresponding to a given member of amongst a plurality of inventory devices. Next, the method proceeds to loading measured object weight 512 and then to 514 clearing receiver buffer. Next, the method proceeds to 516 buffering transmit data and then to 518 loading transaction data frame to transmit first-in, first-out (FIFO) buffer. Next, the method proceeds to 520 transmission of the data frame.

From step 512, the method simultaneously proceeds to 522 transmitting unsent data and then to 524 determination of whether the transmission was successful. If it is determined that the transmission was not successful, the method proceeds to 526 setting a transmit error flag. If it is determined that the transmission was successful, the method proceeds to 528 loading transmission time to transmit FIFO buffer. The method 500 proceeds to main loop 530. In an embodiment, the main loop 530 corresponds to the main loop 302.

The advantage associated with method 500 is that the proposed solution minimizes power usage and makes the inventory device 200 faster due to reduced or intermittent transmission of data by the IOT processor 202. The advantage is particularly significant in some embodiments wherein a plurality of IOT inventory devices is deployed to track or weigh, for example, thousands of tagged inventory items, in a single warehouse thereby preventing the communication hubs, such as Wi-Fi routers from being overwhelmed by the volume of data being transmitted or received.

Yet another challenge in the existing system is that when an item is placed on a balance or a scale to weigh, the scale is usually calibrated to zero before the weighing event, the item is weighed, the weight is recorded, and then the item is removed from the top of the scale or the balance. Such a process that includes removal of the item from the scale or the balance avoids drift in conventional weight measurements because the item is not kept in contact with the weighing surface for, e.g., more than an hour. However, there are many application scenarios of inventory devices where the inventory items are stored on top of the scale for prolonged periods (e.g., a few hours to a few years) of storage. In such scenarios, the inventory device tends to drift recording the weight of the object as heavier and heavier overtime which leads to incorrect measurements. The disclosed embodiments of inventory device 200 avoids such errors by transmitting data only when there is a perceived change over a minimal threshold in the measured weight. Further, in some embodiments, the inventory device 200 compares the weight being measured against multiple weight measurements from the same scale previously and the average of those weights to from a "last known weight." In some embodiments, if the weight received does not exceed the average weights or multiples weights from the same scale, then no event would be triggered. Therefore, the inventory device 200 is able to avoid drift in the weight measurements over time and provides accurate measurements.

Still a further challenge in existing systems is that the inventory system or its components such as inventory device 200 may be damaged, tampered with, lose power, or otherwise be disabled. The disclosed embodiments propose the concept of a "heartbeat signal." In some embodiments, the (IOT) processor 202 is configured to transmit a "heartbeat signal" to a computing node in a cloud network. In an embodiment, the duration of the "heartbeat signal" can range from about 15 seconds to every three hours. In an embodiment, the duration of the "heartbeat signal" can range from about 15 seconds to one minute. In an embodiment, the duration of the "heartbeat signal" can range from about 5 seconds to 30 seconds. In some embodiments, the duration of the "heartbeats signal" can be set by the IOT processor 202 or manually by a user based on one or more predetermined factors. Such factors can include, for example, the historical performance of the inventory device 200, logs of transmission failure or success, number of inventory devices deployed in the inventory system, number of one or more components of the inventory device 200 (e.g., radio field antenna 206, pressure sensors 212a & 212b), processing time of one or more processors (e.g., IOT processor 202, radio field antenna processor 204, pressure sensor processor 208) in the inventory device 200, execution time for one cycle of main loop (e.g., 302), execution time for one cycle of methods described herein (e.g., 400, 500). In an embodiment, the duration of the "heartbeat signal" may be set in a staggered manner (e.g., "t1", "t2", "t3") for different batches or members of the plurality of the inventory devices such that malfunctioning of different members may be detected in an efficient manner without overloading on the cloud computing resources. In an embodiment, the duration of the "heartbeat signal" may be changed for every member or a group of members of the plurality of inventory devices after a predetermined time period based on a randomization algorithm. The "heartbeat signal" provides a way to determine (by a centralized system or a network entity or a cloud computing node) whether or not the inventory device 200 is still functioning correctly. In some embodiments, the data from the inventory device 200 is either a valid transmission (e.g., weight measurements), and error in transmission (e.g., transmission error flag), or the heartbeat signal.

Distributed Computing Network and IOT Device

In some embodiments, one or more IOT devices may be implemented in a distributed computing network as part of the inventory system 100 to meet the requirements of fast and accurate detection of a tagged inventory item. For instance, the distributed computing network can include an IOT device that provides command and control functions for the sensor system comprising the radio field antenna 206 (or RFID antenna), the radio field antenna processor 204 (or RFID processor), a plurality of pressure sensors or a pressure sensor array (e.g., 212a, 212b), and pressure sensor or array processor (e.g., 208). In an embodiment, the IOT device can be configured to send commands to the pressure array processor and to the RFID processor requesting for data. The IOT device can further be configured to send transaction data to a private Wi-fi access point. In an embodiment, the IOT device is further configured to receive broadcast load cell data from the pressure array processor and RFID scan results from the RFID processor. In an embodiment, the IOT device is configured to initialize the inventory system by checking for a network connection and a valid sensor identification. In an embodiment, the IOT device is configured to send configuration commands to the pressure array processor and command the pressure array to start broadcasting pressure values from each pressure sensor of a plurality of pressure sensors. In an embodiment, the pressure array processor performs analog filtration, sampling, and time tagged broadcasting of the data from each pressure sensor upon receiving the start command from the IOT device. In some embodiments, the use of an independent broadcast of the data from the pressure sensors can provide data at high speed for fast detection of weight changes to the IOT device without the need for any additional commands or time delays from the IOT device.

In some embodiments, the IOT device is configured to perform data analysis and testing to determine if a valid transaction has occurred. In some embodiments, using a series of parameter-controlled functions, the broadcast pressure array data is converted by the IOT device into a sanitized stream of sequential FIFO time buffered pressure sensor data. In an embodiment, the parameter-controlled functions include rate-controlled sampling, linear regression scaling and multipoint averaging. In an embodiment, the IOT device computes the weight data stream by calculating the sum of the scaled average from each of the pressure sensors. The derived weight data stream (array W(t) where w(i), ..., W(1), W(0), W(−1), ... W(−3), ...,W(−n)) is then sampled by the IOT Device:

where W(0) is the weight reading from the time at which the threshold (of weight change) was exceeded, where W(−1) is the weight reading from the time frame that is one reading before the weight reading exceeded the threshold, where W(−2) is the weight reading from the time frame that is two readings before the weight reading exceeded the threshold, where W(−n) is the weight reading from the time frame that is n readings before the weight reading exceeded the threshold, where W(1) is the weight reading from the time frame that is one reading after the weight reading exceeded the threshold, where W(i) is the weight reading from the time frame that is one reading before the stable weight reading, and where W(j) is the weight reading from the time frame that is j readings after the threshold exceeding weight reading and at the time frame where the weight is stable.

In some embodiments, the IOT device is configured to monitor weight data stream to determine if a valid arrival or departure has occurred using preset thresholds. To minimize errors in the weight determination due to random noise in the weight data stream, in an embodiment, the IOT device uses averaging and thresholding to block spurious weight changes. A running average of W(0) to W(−n) where −n is the number of samples used for the average as determined by a preset sample size. To prevent errors in the weight determination due to drift of the weight sensors or loss of mass in the existing inventory items, the IOT device, in an embodiment, uses a "look back" Tare function. Such a "look back" function uses the averaged weight reading prior in time to the threshold triggered W(−1) to set a local Tare weight. For example, in some embodiments, a five sample running average can be determined, where W(−1) to W(−5), and the average weight of these 5 weights is determined and used. In an embodiment, a stabilization threshold is used to prevent noise in the weight reading due to motion of the inventory or due to settling time of the pressure sensors.

In an embodiment, when the change from a first sample to a second sample (e.g., W(j) to W(i)) falls below the stabilization threshold, the corresponding point is considered as the stabilized weight. The stabilized weight W(i) corresponds to the post arrival weight of the inventory item. The local Tare value (average at W(−1)) is subtracted from the stabilized weight W(i) to derive the arrival weight of the inventory item that is immune to or reduces errors from sensor drift, random noise and sensor settling. In some embodiments, the local Tare value is the running average weight at W(−1).

In some embodiments, the IOT device triggers an on-demand RFID read scan when the weight threshold is triggered. This scan is performed only "on demand" in order to reduce the power consumption of the RFID processor. In some embodiments, while the IOT device is monitoring the weight data stream for the stabilized weight, the RFID scan data is processed to determine which RFID tag has arrived or left the field of the RFID antenna.

In some embodiments, the IOT device determines that a valid arrival transaction has occurred if a stabilized weight is determined in conjunction with a single arriving RFID. Data from the valid arrival transaction is transmitted to the private Wi-fi access point for transmission to a cloud server in a cloud computing network. If no RFID arrival is detected or more than one RFID arrival is detected, the transaction is considered invalid, and the transaction data is not sent to the cloud server thereby conserving cloud computing resources. In some embodiments, the inventory status of the items in an invalid transaction will be updated upon the next valid transaction for those items.

In some embodiments, the IOT device monitors the health of the inventory system by performing a "heartbeat" scan. In an embodiment, this scan is performed after a preset time of no valid transactions being detected. The "heartbeat" scan triggers an RFID scan and transmission of the RFID scan output to the cloud server through the private Wi-fi access point. The heartbeat scan can also list all RFID tags present on a particular inventory device. This heartbeat scan can be compared to the previous list of RFID tags on an inventory device to detect if any tags were added or removed without being noticed, such as during a power outage. In an embodiment, this data provides confirmation of the functioning of the sensor system (or the inventory device). In some embodiments, this data can be made available for system analysis and maintenance functions performed by an operator or any authorized and qualified personnel. This feature proposed by the disclosed embodiments provide continual transmission of system health information to the cloud server.

In some embodiments, the IOT device can be configured to auto-upgrade its software in response to commands and software packages transmitted through the private Wi-fi access point or through a Bluetooth® connection from a mobile device. In some embodiments, update of the parameters and code of both the pressure array processor and the RFID antenna processor can be performed by the IOT device in response to one or more commands sent to the IOT device.

In some embodiments, the distributed computing network includes a mobile device executing a mobile application software generating information using data provided by the cloud server in conjunction with one or more user parameters and data processing performed by the mobile device. In an embodiment, the mobile application software can provide the user (of mobile device) with graphics and reports from inventory information stored on the cloud network. When a user activates a report or data list on the mobile application software, user preferences defined and stored on the mobile device are used by the mobile application software to transmit data queries to the cloud server over the mobile communication network.

In an embodiment, the cloud server responds to the query from the mobile device with a data set corresponding to the report or chart requested by the user through the mobile application software. The mobile application software uses this data set to generate the reports and graphics in accordance with the user preferences. The data query operations performed on the cloud server is most efficient due to the size of the database and the speed of SQL (Structured Query Language) server processing. The reports and graphics are generated at the mobile device for speed and distributed resource efficiency. After the data set is delivered from the cloud server, the locally generated reports and graphics at the mobile device do not require any additional cloud resources.

System Methods

Embodiments of a method of detecting and reporting a plurality of tagged inventory items are disclosed. In an embodiment, the method includes: providing a plurality of tagged inventory items, wherein the plurality tagged inventory items include a radio field tag attached to an inventory item; and providing a plurality of Internet of Things ((IOT) inventory devices, wherein the plurality of IOT inventory devices include a weighing surface and contains at least one pressure sensor, a pressure sensor processor, a radio field antenna, a radio field antenna processor, and an IOT processor. The weighing surface is located on a top side of the plurality of IOT inventory devices, and the radio field antenna is positioned beneath the weighing surface, and wherein the IOT processor is connected to at least one pressure sensor through the pressure sensor processor and the IOT processor is connected to the radio field antenna through the radio field antenna processor; and wherein at least one member of the plurality of IOT inventory devices is connected to a communications node.

In some embodiments, the method further includes detecting a weight change of from about 25.0 g to about 45.0 kg when a member of the plurality of tagged inventory items is placed into contact with the weighing surface of a member of the plurality of IOT inventory devices, determining that a difference between a load pressure of the member of the plurality of tagged inventory items and the last measured load pressure for the member of the plurality of IOT inventory devices exceeds a threshold value, and identifying the member of the plurality of tagged inventory items by scanning the radio field tag with the radio field antenna.

In some embodiments, determining that the difference between the load pressure of the member of the plurality of tagged inventory items and the last measured load pressure for the member of the plurality of IOT inventory devices exceeds the threshold value includes, measuring the load pressure of the member of the plurality of tagged inventory items; and retrieving the last measured load pressure from the pressure sensor processor of the member of the plurality of IOT inventory devices, and subtracting the measured load pressure from the last measured load pressure.

In some embodiments, identifying the member of the plurality of tagged inventory items by scanning the radio field tag with the radio field antenna includes, generating a scanned radio field identification from the member of the plurality of tagged inventory items by turning on or activating the radio field antenna of the member of the plurality of IOT inventory devices and scanning the radio field tag, retrieving local radio field identification data from the IOT processor of the member of the plurality of IOT inventory devices, and determining that a new radio field tag is present by comparing the scanned radio field identification to the local radio field identification data.

In some embodiments, the method further includes, after identifying the member of the plurality of tagged inventory items by scanning the radio field tag with the radio field antenna, building a data frame in the IOT processor of the member of the plurality of IOT inventory devices, and transmitting the data frame from the IOT processor of the member of the plurality of IOT inventory devices to the communications node.

In some embodiments, building the data frame in the IOT processor of the member of the plurality of IOT inventory devices includes, retrieving two or more of: the load pressure of the member of the plurality of tagged inventory items, the scanned radio field identification of the member of the plurality of tagged inventory items, a load transaction date, a load transaction time, and identification data from the member of the plurality of IOT inventory devices, or a combination thereof.

In some embodiments, transmitting the data frame from the IOT processor of the member of the plurality of IOT inventory devices to the communications node includes, sending the data frame to a first in, first out (FIFO) buffer of the IOT processor of the member of the plurality of IOT inventory devices, transmitting the data frame from the IOT processor to the least one communication node, and reducing power usage by the member of the plurality of IOT inventory devices by deactivating or turning off the radio field antenna of the member of the plurality of IOT inventory devices.

In some embodiments, the plurality of pressure sensors include an array of force sensing resistors. In some embodiments, radio field tag code is transmitted from the at least one radio field antenna. In some embodiments, the method includes transmitting at least one of a measurement time, a measurement date, a radio field tag code, a tagged inventory item identity, a temperature, a weight, and an inventory device code from the system processor to at least one of the database, the network, and the display. In some embodiments, the method includes turning off or powering down the at least one radio field antenna after communicating or transmitting a radio field tag code to the system processor.

In some embodiments, the method includes attaching a radio field tag to a surface of an inventory item, forming a tagged inventory item. In some embodiments, the method includes attaching a radio field tag to a surface of an inventory item before, during, or after the item is added to inventory. In some embodiments, the method includes attaching a radio field tag to a surface of an inventory item before, during, or after the inventory item is opened, forming a tagged inventory item, including an opened tagged inventory item. In some embodiments, the method includes opening a tagged inventory item to remove an amount of content.

In some embodiments, a plurality of tagged inventory items are stored on a plurality of inventory devices for a duration of from minutes to years. In some embodiments, the method includes removing a tagged inventory item from the inventory device. In some embodiments, the method includes removing or adding an amount of content to the tagged inventory item. In some embodiments, the method includes removing or adding an amount of content from the tagged inventory item, while the tagged inventory item remains on the inventory device. One benefit of the method disclosed herein can be maintaining, tracking, or monitoring an inventory in real time by monitoring a plurality of tagged inventory items stored on a plurality of inventory devices.

In an embodiment of the method, the weight change can include about 25.0 g to about 45.0 kg, including from about 50.0 g to about 40.0 kg, including from about 75 g to about 35 kg. In an embodiment of the method, the IOT processor can transmit a signal to the at least one radio field antenna, turning off the radio field antenna based at least on a predetermined criteria. One benefit of an embodiment of the system and method disclosed herein can be that the at least one radio field antenna is periodically turned on during from about 1 seconds to about 5 minutes after a weight change is detected, instead of remaining constantly on. One benefit of an embodiment of the system and method disclosed herein can be that the at least one radio field antenna is turned off by the system processor from about 1 seconds to about 5 minutes after weighing the tagged inventory item, instead of remaining constantly on. This benefit can reduce power consumption and limit radio frequency emissions when tagged inventory items are stored on inventory devices without weight change for prolonged periods of time.

In some embodiments, the method includes accessing the database and determining the location of a tagged inventory item on an inventory device. In some embodiments, the method includes selecting one or more tagged inventory items, optionally on a display, and the system processor transmitting a signal to the one or more corresponding inventory devices, turning on or changing the pattern of luminescence of the light source on the exterior of the inventory device.

Embodiments of a computer program product for detecting and reporting a plurality of tagged inventory items are disclosed. In an embodiment, the computer program product includes one or more computer readable storage media collectively having program instructions embodied therewith, the program instructions executable by an Internet of Things ((IOT) processor to: cause the IOT processor to detect a weight change of from about 25.0 g to about 45.0 kg when a member of a plurality of tagged inventory items is placed into contact with a weighing surface of a member of a plurality of Internet of Things ((IOT) inventory devices, wherein the plurality of IOT inventory devices includes the weighing surface and contains at least one pressure sensor, a pressure sensor processor, a radio field antenna, a radio field antenna processor, and the Internet of Things ((IOT) processor, wherein member of the plurality of IOT inventory devices is connected to a database through a communications node; determine that a difference between a load pressure of the member of the plurality of tagged inventory items and a last measured load pressure for the member of the plurality of IOT inventory devices exceeds a threshold value; and identify the member of the plurality of tagged inventory items by scanning the radio field tag with the radio field antenna.

In some embodiments of the computer program product, the program instructions further cause the IOT processor to: measure the load pressure of the member of the plurality of tagged inventory items, and retrieve the last measured load pressure from the pressure sensor processor of the member of the plurality of IOT inventory devices, and subtract the measured load pressure from the last measured load pressure.

In some embodiments of the computer program product, the program instructions further cause the IOT processor to: generate a scanned radio field identification from the member of the plurality of tagged inventory items by turning on or activating the radio field antenna of the member of the plurality of IOT inventory devices and scanning the radio field tag, retrieve local radio field identification data from the IOT processor of the member of the plurality of IOT inventory devices, and determine that a new radio field tag is present by comparing the scanned radio field identification to the local radio field identification data. In some embodiments of the computer program product, the program instructions further cause the IOT processor to: build a data frame in the IOT processor of the member of the plurality of IOT inventory devices, and transmit the data frame from the IOT processor of the member of the plurality of IOT inventory devices to the communications node. In some embodiments of the computer program product, the program instructions further cause the IOT processor to: send the data frame to a first in, first out (FIFO) buffer of the IOT processor of the member of the plurality of IOT inventory devices, transmit the data frame from the IOT processor to the communications node, and then reduce power usage by the member of the plurality of IOT inventory devices by deactivating or turning off the radio field antenna of the member of the plurality of IOT inventory devices.

In some embodiments of the computer program product, the program instructions further cause the IOT processor to: command the pressure sensor processor to send a data stream of pressure sensor values from the pressure sensor processor to the IOT processor; determine that no difference between load pressures of the data stream and a last measured load pressure for the member of the plurality of IOT inventory devices has exceeded the threshold value for a threshold duration; and perform a periodic scan when the threshold duration is met by sending a command to the radio field antenna to scan for tagged inventory items; build a periodic data frame in the IOT processor of the member of the plurality of IOT inventory devices; and transmit the periodic data frame to the database through the communications hub.

In more detail,

Embodiment 1

An inventory system comprising a plurality of tagged inventory items, wherein the plurality tagged inventory items includes a radio field tag attached to an inventory item; and a plurality of Internet of Things (IOT) inventory devices, wherein the plurality of Internet of Things (IOT) inventory devices includes a weighing surface and contains at least one pressure sensor, a pressure sensor processor, a radio field antenna, a radio field antenna processor, and an Internet of Things (IOT) processor, wherein the weighing surface is located on a top side of the plurality of IOT inventory devices, and the radio field antenna is positioned beneath the weighing surface, and wherein the IOT processor is connected to the at least one pressure sensor through the pressure sensor processor and the IOT processor is connected to the radio field antenna through the radio field antenna processor; and wherein at least one member of the plurality of IOT inventory devices is connected to a communications node.

Embodiment 2

The system of any one of embodiments 1 and 3-13, wherein the radio field tag includes an item adhesive layer, a polymer foam layer, and an integrated circuit layer, and wherein the polymer foam layer is in contact with and located between the item adhesive layer and the integrated circuit layer.

Embodiment 3

The system of any one of embodiments 1-2 and 4-13, wherein the radio field tag is a passive radio frequency identification tag, a battery assisted radio frequency identification tag, an active radio frequency identification tag, or a passive nearfield tag.

Embodiment 4

The system of any one of embodiments 1-3, and 5-13, wherein the at least one radio field antenna includes an active radio field antenna or a passive radio field antenna.

Embodiment 5

The system of any one of embodiments 1-4 and 6-13, wherein the plurality of inventory devices includes a top and a bottom, wherein the at least one pressure sensor includes an array of force sensing resistors located between the weighing surface and the at least one radio field antenna, and wherein the at least one pressures sensor is connected to supports that extend from the bottom of the inventory device.

Embodiment 6

The system of any one of embodiments 1-5 and 7-13, wherein the IOT processor includes a memory storage, a wireless processor, and a transmitter, wherein the wireless processor includes a receive packet input and a transmit packet output, and the wireless processor is capable of or configured to transmit wireless packets and receive wireless packets, and optionally a power source, including power port or a configuration for adapting and using batteries.

Embodiment 7

The system of any one of embodiments 1-6 and 8-13, wherein the communications node is a wireless communications node.

Embodiment 8

The system of any one of embodiments 1-7 and 9-13, the communications node is an internet router, a wireless internet router, a cellular tower, a communications satellite, or a combination thereof.

Embodiment 9

The system of any one of embodiments 1-8 and 10-13, wherein the inventory system further comprises a server connected to the communications node through an internet.

Embodiment 10

The system of any one of embodiments 1-9 and 11-13, the inventory system further comprises a plurality of the (IOT) inventory devices networked through a plurality of communications nodes.

Embodiment 11

The system of any one of embodiments 1-10 and 12-13, wherein the at least one pressure sensor is closer to the bottom of the inventory device than the at least one radio field antenna.

Embodiment 12

The system of any one of embodiments 1-11 and 13, wherein the at least one pressure sensor and the at least one radio field antenna are configured to communicate with the (IOT) processor, and wherein the (IOT) processor is configured to communicate with at least one of a database, a display, and a network.

Embodiment 13

The system of any one of embodiments 1-12, wherein the tagged inventory item includes a vessel containing an amount of content, wherein the content includes a solid, a liquid, a slurry, a particulate, or a combination thereof.

Embodiment 14

A method of detecting and reporting a plurality of tagged inventory items comprising: providing a plurality of tagged inventory items, wherein the plurality tagged inventory items include a radio field tag attached to an inventory item; and providing a plurality of Internet of Things (IOT) inventory devices, wherein the plurality of IOT inventory devices include a weighing surface and contains at least one pressure sensor, a pressure sensor processor, a radio field antenna, a radio field antenna processor, and an IOT processor. The weighing surface is located on a top side of the plurality of IOT inventory devices, and the radio field antenna is positioned beneath the weighing surface, and wherein the IOT processor is connected to at least one pressure sensor through the pressure sensor processor and the IOT processor is connected to the radio field antenna through the radio field antenna processor; and wherein at least one member of the plurality of IOT inventory devices is connected to a communications node; detecting a weight change of from about 25.0 g to about 45.0 kg when a member of the plurality of tagged inventory items is placed into contact with the weighing surface of a member of the plurality of IOT inventory devices, determining that a difference between a load pressure of the member of the plurality of tagged inventory items and the last measured load pressure for the member of the plurality of (IOT) inventory devices exceeds a threshold value, and identifying the member of the plurality of tagged inventory items by scanning the radio field tag with the radio field antenna.

Embodiment 15

The method of any one of embodiments 14, and 16-19, wherein determining that the difference between the load pressure of the member of the plurality of tagged inventory items and the last measured load pressure for the member of the plurality of (IOT) inventory devices exceeds the threshold value includes, measuring the load pressure of the member of the plurality of tagged inventory items; and retrieving the last measured load pressure from the pressure sensor processor of the member of the plurality of (IOT) inventory devices, and subtracting the measured load pressure from the last measured load pressure.

Embodiment 16

The method of any one of embodiments 14-15, and 17-19, wherein identifying the member of the plurality of tagged inventory items by scanning the radio field tag with the radio field antenna includes, generating a scanned radio field identification from the member of the plurality of tagged inventory items by turning on or activating the radio field antenna of the member of the plurality of IOT inventory devices and scanning the radio field tag, retrieving local radio field identification data from the IOT processor of the member of the plurality of IOT inventory devices, and determining that a new radio field tag is present by comparing the scanned radio field identification to the local radio field identification data.

Embodiment 17

The method of any one of embodiments 14-16, and 18-19, further comprising, after identifying the member of the plurality of tagged inventory items by scanning the radio field tag with the radio field antenna, building a data frame in the IOT processor of the member of the plurality of IOT inventory devices, and transmitting the data frame from the IOT processor of the member of the plurality of IOT inventory devices to the communications node.

Embodiment 18

The method of any one of embodiments 14-17, and 19 wherein building the data frame in the IOT processor of the member of the plurality of IOT inventory devices includes, retrieving two or more of: the load pressure of the member of the plurality of tagged inventory items, the scanned radio field identification of the member of the plurality of tagged inventory items, a load transaction date, a load transaction time, and identification data from the member of the plurality of IOT inventory devices, or a combination thereof.

Embodiment 19

The method of any one of embodiments 14-18, wherein transmitting the data frame from the IOT processor of the member of the plurality of IOT inventory devices to the communications node includes, sending the data frame to a first in, first out (FIFO) buffer of the IOT processor of the member of the plurality of IOT inventory devices, transmitting the data frame from the IOT processor to the least one communication node, and reducing power usage by the member of the plurality of (IOT) inventory devices by deactivating or turning off the radio field antenna of the member of the plurality of (IOT) inventory devices.

Embodiment 20

The method of any of embodiments 14-19, wherein the plurality of pressure sensors include an array of force sensing resistors, wherein a radio field tag code is transmitted from the at least one radio field antenna.

Embodiment 21

A computer program product for detecting and reporting a plurality of tagged inventory items, the computer program product comprising one or more computer readable storage media collectively having program instructions embodied therewith, the program instructions executable by an Internet of Things (IOT) processor to cause the IOT processor to: detect a weight change of from about 25.0 g to about 45.0 kg when a member of a plurality of tagged inventory items is placed into contact with a weighing surface of a member of a plurality of Internet of Things (IOT) inventory devices, wherein the plurality of IOT inventory devices includes the weighing surface and contains at least one pressure sensor, a pressure sensor processor, a radio field antenna, a radio field antenna processor, and the Internet of Things (IOT) processor, wherein member of the plurality of (IOT) inventory devices is connected to a database through a communications node; determine that a difference between a load pressure of the member of the plurality of tagged inventory items and a last measured load pressure for the member of the plurality of (IOT) inventory devices exceeds a threshold value; and identify the member of the plurality of tagged inventory items by scanning the radio field tag with the radio field antenna.

Embodiment 22

The computer program product of any of the embodiments 21, and 23-26, wherein the program instructions further cause the (IOT) processor to: measure the load pressure of the member of the plurality of tagged inventory items, and retrieve the last measured load pressure from the pressure sensor processor of the member of the plurality of (IOT) inventory devices, and subtract the measured load pressure from the last measured load pressure.

Embodiment 23

The computer program product of any of the embodiments 21-22, and 24-26, wherein the program instructions further cause the (IOT) processor to: generate a scanned radio field identification from the member of the plurality of tagged inventory items by turning on or activating the radio field antenna of the member of the plurality of (IOT) inventory devices and scanning the radio field tag, retrieve local radio field identification data from the (IOT) processor of the member of the plurality of IOT inventory devices, and determine that a new radio field tag is present by comparing the scanned radio field identification to the local radio field identification data.

Embodiment 24

The computer program product of any of the embodiments 21-23 and 25-26, wherein the program instructions further cause the IOT processor to: build a data frame in the IOT processor of the member of the plurality of IOT inventory devices, and transmit the data frame from the IOT processor of the member of the plurality of IOT inventory devices to the communications node.

Embodiment 25

The computer program product of any of the embodiments 21-24, and 26, wherein the program instructions further cause the IOT processor to: send the data frame to a first in, first out (FIFO) buffer of the IOT processor of the member of the plurality of IOT inventory devices, transmit the data frame from the IOT processor to the communications node, and then reduce power usage by the member of the plurality of IOT inventory devices by deactivating or turning off the radio field antenna of the member of the plurality of IOT inventory devices.

Embodiment 26

The computer program product of any of the embodiments 21-25, wherein the program instructions further cause the IOT processor to: command the pressure sensor processor to send a data stream of pressure sensor values from the pressure sensor processor to the IOT processor; determine that no difference between load pressures of the data stream and a last measured load pressure for the member of the plurality of IOT inventory devices has exceeded the threshold value for a threshold duration; perform a periodic scan when the threshold duration is met by sending a command to the radio field antenna to scan for tagged inventory items; build a periodic data frame in the IOT processor of the member of the plurality of IOT inventory devices; and transmit the periodic data frame to the database through the communications hub.

EXAMPLES

Functional Components
Identification Tag
RFID Tags are custom made using antenna patterns and preprogrammed imbedded RFID devices packaged with human and machine readable printed RFID tag information can be purchased from Starport Technologies (Kansas City, Mo.).
A Foam Adhesive, such as SCOTCH® Foam Mounting Tape, is commercially purchased from 3M® (Maplewood, Minn.).
Pressure Sensing
An FSR Array, such as the Thru Mode FSR Matrix Array is commercially purchased from SENSITRONICS, LLC® (Bow, Wash.).
An FSR to USB Interface, such as the MP2508 or Snowboard 2 can be commercially purchased from Kitronyx (Seoul, Korea).
A planar load cell, can be commercially purchased from Tecuna Systems (Golden, Colo.).
A customized load cell to serial signal conditioner and interface can be purchased from Tecuna Systems (Golden Colo.).
Identification Sensor
An OmniDirectional RFID Antenna, such as the CAF95956 can be commercially purchased from LAIRD TECHNOLOGIES® (Chesterfield, Mo.).
A shelf panel RFID Antenna can be commercially purchased from TIMES-7 (Wellington, New Zealand).
An RFID Reader, such as the ThingMagic USB Pro can be commercially purchased from JADAK TECHNOLOGIES® (North Syracuse, N.Y.).
Client Platform
A Laptop PC can be commercially purchased. (HP® INTEL® CORE™ i7 Laptop PC M6-W105DX HEWLETT PACKARD®, INC; Palo Alto Calif.).
ARDUINO® Snowboard Interface Software can be commercially purchased from Kitronyx (Seoul, Korea).
Snowforce Application Software can be commercially purchased from Kitronyx (Seoul, Korea).
ThingMagic Universal Reader Assistant Software can be commercially purchased from JADAK TECHNOLOGIES® (North Syracuse, N.Y.).
Spreadsheet Software (MICROSOFT® Office 360 EXCEL® can be commercially purchased from MICROSOFT® (Redmond, Wash.).
Windows Operating System (MICROSOFT® Windows 10®) can be commercially purchased from MICROSOFT® (Redmond, Wash.).

EXPERIMENTAL

Example 1

A proof of concept experimental preparation can be made from available materials. The experimental preparation can perform the functions of pressure mapping, identification, and processing. The sensor components are stacked and attached to the supports of the inventory device as described in embodiments herein for the purpose of detecting the pressure pattern and identification of a tagged inventory item. The output of the sensor components is connected to the Client Platform using USB interfaces.

The pressure pattern detection can be accomplished using a FSR Array connected to a USB interface. The FSR array to USB interface output is provided to the Client Platform through the USB interface.

The identification detection can be accomplished using an OmniDirectional RFID Antenna connected to an RFID Reader. The RFID Reader output is provided to the Client Platform using a USB interface.

The sensor mat can be realized by attaching the FSR array to the plurality of supports. The FSR array is connected to the USB Interface. The RFID antenna is connected the RFID reader. Both the FSR array to USB Interface and the RFID reader are connected to the Client Platform.

Processing of the pressure array and RFID data is performed by the Client Platform. The Client Platform can be implemented using a Laptop PC with a Windows 10 Operating System. The pressure data can be read on the Client Platform using Arduino Snowboard Interface with Snowforce Application Software. The RFID data can be read on the Client Platform using ThingMagic Universal Reader Assistant Software. Numeric preparation of the data and database functions can be performed using Spreadsheet Software.

The inventory item tag can be prepared by applying an RFID tag that can be attached to an inventory item using foam mounting tape to provide an embodiment of a radio field tag.

The experiment is conducted to demonstrate that a tagged inventory item can be identified and associated with its pressure pattern for the purposes of tracking the identification and weight of a tagged inventory item over time. An identification tag is prepared by pre-programming an inventory item tag with a unique test identification code. The programmed tag is applied to the bottom surface of an inventory item containing liquid. The inventory item is placed on the weighing surface. The FSR array detects the pressure pattern of the inventory item based on the pressure exerted by the item on the weighing surface and a data array is calculated by the Snowforce Application Software. The data from the identification tag is read by the RFID reader and is transferred to the Universal Reader Assistant Software. A test reading entry is made in the spreadsheet software by combining the RFID reader identification data with the Snowboard Application Software pressure array data and attaching the time. The data entry is added to a sample database in the spreadsheet software. The experiment continues by removing liquid from the inventory item and taking additional readings. Various inventory related information can be calculated by processing the information in the database.

Example 2

Example 2 is the same as Example 1 above except, planar load cells are attached to the plurality of supports instead of an FSR Array. The Tacuna Systems planar load cells, which are, a type of pressure sensor (force sensing resistors), are applied to a beam. The planar load cells are shaped to direct forces that are applied between the end of the beam attached beneath the upper weighing surface and the end of the beam that is connected to the lower support surface via a shock absorbing or cushioning interface, which is a type of support (e.g. rubber feet). The planar load cells force sensing resistors are connected to the Tacuna Systems load cell to serial signal conditioner and interface instead of the Snowforce Interface. The output of the Tacuna Systems load cell to serial signal conditioner and interface is connected to the laptop PC using a USB port. The serial data communications uses MICROSOFT® Windows 10® Terminal Application instead of the Snowboard Application software.

What is claimed is:
1. An inventory system comprising:
a plurality of tagged inventory items, wherein the plurality tagged inventory items includes a radio field tag attached to an inventory item; and
a plurality of Internet of Things (IOT) inventory devices, wherein the plurality of Internet of Things (IOT) inventory devices includes a weighing surface and contains at least one pressure sensor, a pressure sensor processor, a radio field antenna, a radio field antenna processor, and an Internet of Things (IOT) processor,
wherein the weighing surface is located on a top side of the plurality of IOT inventory devices, and the radio field antenna is positioned beneath the weighing surface, and
wherein the IOT processor is connected to the at least one pressure sensor through the pressure sensor processor and the IOT processor is connected to the radio field antenna through the radio field antenna processor; and
wherein at least one member of the plurality of IOT inventory devices is connected to a communications node,
wherein the plurality of inventory devices includes a top and a bottom, and
wherein the at least one pressure sensor includes a plurality of pressor sensors that are attached to a plurality of supports, wherein the plurality of supports extend from the bottom of the inventory device and each support has one or more pressure sensors attached to the support.

2. An inventory system comprising:
a plurality of tagged inventory items, wherein the plurality tagged inventory items includes a radio field tag attached to an inventory item; and
a plurality of Internet of Things (IOT) inventory devices, wherein the plurality of Internet of Things (IOT) inventory devices includes a weighing surface and contains at least one pressure sensor, a pressure sensor processor, a radio field antenna, a radio field antenna processor, and an Internet of Things (IOT) processor,
wherein the weighing surface is located on a top side of the plurality of IOT inventory devices, and the radio field antenna is positioned beneath the weighing surface, and
wherein the IOT processor is connected to the at least one pressure sensor through the pressure sensor processor and the IOT processor is connected to the radio field antenna through the radio field antenna processor; and
wherein at least one member of the plurality of IOT inventory devices is connected to a communications node,
wherein the plurality of inventory devices includes a top and a bottom,
wherein the at least one pressures sensor includes a plurality of pressure sensors that are attached to a plurality of supports, wherein the plurality of supports extend from the bottom of the inventory device and each support has one or more pressure sensors attached to the support, wherein the radio field tag includes an item adhesive layer, a polymer foam layer, and an integrated circuit layer, and wherein the polymer foam layer is in contact with and located between the item adhesive layer and the integrated circuit layer.

3. The inventory system of claim 1, wherein the IOT processor includes a memory storage, a wireless processor, and a transmitter, wherein the wireless processor includes a receive packet input and a transmit packet output, and the wireless processor is configured to transmit wireless packets and receive wireless packets.

4. The inventory system of claim 1, wherein the communications node is a wireless communications node.

5. The inventory system of claim 1, further comprising a server connected to the communications node through an internet.

6. A method of detecting and reporting a plurality of tagged inventory items, the method comprising:

providing a plurality of tagged inventory items, wherein the plurality tagged inventory items include a radio field tag attached to an inventory item; and providing a plurality of Internet of Things (IOT) inventory devices, wherein the plurality of IOT inventory devices include a weighing surface and contains at least one pressure sensor, a pressure sensor processor, a radio field antenna, a radio field antenna processor, and an IOT processor, wherein the weighing surface is located on a top side of the plurality of IOT inventory devices, and the radio field antenna is positioned beneath the weighing surface, and wherein the IOT processor is connected to the at least one pressure sensor through the pressure sensor processor and the IOT processor is connected to the radio field antenna through the radio field antenna processor; and wherein at least one member of the plurality of IOT inventory devices is connected to a communications node, and wherein the plurality of inventory devices includes a top and a bottom, and wherein the at least one pressures sensor includes a plurality of pressure sensors that are attached to a plurality of supports, wherein the plurality of supports extend from the bottom of the inventory device and each support has one or more pressure sensors attached to the support;

detecting a weight change of from about 25.0 g to about 45.0 kg when a member of the plurality of tagged inventory items is placed into contact with the weighing surface of a member of the plurality of IOT inventory devices;

determining that a difference between a load pressure of the member of the plurality of tagged inventory items and the last measured load pressure for the member of the plurality of IOT inventory devices exceeds a threshold value; and identifying the member of the plurality of tagged inventory items by scanning the radio field tag with the radio field antenna.

7. The method of claim 6, wherein determining that the difference between the load pressure of the member of the plurality of tagged inventory items and the last measured load pressure for the member of the plurality of IOT inventory devices exceeds the threshold value includes, measuring the load pressure of the member of the plurality of tagged inventory items; and retrieving the last measured load pressure from the pressure sensor processor of the member of the plurality of IOT inventory devices, and subtracting the measured load pressure from the last measured load pressure.

8. The method of claim 6, wherein identifying the member of the plurality of tagged inventory items by scanning the radio field tag with the radio field antenna includes, generating a scanned radio field identification from the member of the plurality of tagged inventory items by turning on or activating the radio field antenna of the member of the plurality of IOT inventory devices and scanning the radio field tag, retrieving local radio field identification data from the IOT processor of the member of the plurality of IOT inventory devices, and determining that a new radio field tag is present by comparing the scanned radio field identification to the local radio field identification data.

9. The method of claim 6, further comprising:

after identifying the member of the plurality of tagged inventory items by scanning the radio field tag with the radio field antenna, building a data frame in the IOT processor of the member of the plurality of IOT inventory devices, and transmitting the data frame from the IOT processor of the member of the plurality of IOT inventory devices to the communications node.

10. The method of claim 9, wherein building the data frame in the IOT processor of the member of the plurality of IOT inventory devices includes, retrieving two or more of: the load pressure of the member of the plurality of tagged inventory items, the scanned radio field identification of the member of the plurality of tagged inventory items, a load transaction date, a load transaction time, and identification data from the member of the plurality of IOT inventory devices, or a combination thereof.

11. The method of claim 9, wherein transmitting the data frame from the IOT processor of the member of the plurality of IOT inventory devices to the communications node includes, sending the data frame to a first in, first out (FIFO) buffer of the IOT processor of the member of the plurality of IOT inventory devices, transmitting the data frame from the IOT processor to the least one communication node, and reducing power usage by the member of the plurality of IOT inventory devices by deactivating or turning off the radio field antenna of the member of the plurality of IOT inventory devices.

* * * * *